United States Patent [19]

Buhler

[11] 4,030,012
[45] June 14, 1977

[54] AMPLIFIER MALFUNCTION DETECTOR
[75] Inventor: Otto Richard Buhler, Boulder, Colo.
[73] Assignee: International Business Machines Corporation, Armonk, N.Y.
[22] Filed: June 23, 1975
[21] Appl. No.: 589,100
[52] U.S. Cl. .................................. 318/565; 361/86; 330/207 P; 307/359
[51] Int. Cl.² .......................................... H02H 3/28
[58] Field of Search ............ 318/565; 330/2, 207 P; 340/253 A, 253 B, 248 A, 248 B, 248 C; 307/235 K; 317/31

[56] References Cited
UNITED STATES PATENTS

| | | | |
|---|---|---|---|
| 3,406,319 | 10/1968 | Faulkes | 318/565 |
| 3,544,983 | 12/1970 | Wallace et al. | 340/248 A |
| 3,657,660 | 4/1972 | Pfersch | 318/565 UX |
| 3,761,775 | 9/1973 | Ozawa et al. | 317/27 R |
| 3,809,335 | 5/1974 | Mantey | 242/186 |
| 3,880,385 | 4/1975 | Reynolds et al. | 318/565 X |
| 3,891,933 | 6/1975 | Suzuki et al. | 330/207 P |
| 3,931,547 | 1/1976 | Glogolja | 317/31 |

Primary Examiner—Robert K. Schaefer
Assistant Examiner—John J. Feldhaus
Attorney, Agent, or Firm—Joscelyn G. Cockburn

[57] ABSTRACT

A detection device for sensing malfunctions in a wide band power amplifier, driving the take-up spool motor of a reel-to-reel tape transport system, is disclosed. A feedback loop is connected from the output of the amplifier to a malfunction junction positioned at the input of the amplifier. The signal at the malfunction junction is monitored and compared with a predetermined range of standard reference signals. Whenever the malfunction junction signal is out of the predetermined range, the power amplifier is turned off thereby preventing damage to the tape. A filter means is positioned so as to desensitize the compare means until the amplifier is operating at steady state.

11 Claims, 5 Drawing Figures

AMPLIFIER MALFUNCTION DETECTOR

BACKGROUND OF THE INVENTION

1. Field of the Invention

The invention relates generally to circuits for detecting malfunction in amplifiers and more specifically for an improved circuit for detecting amplifier malfunction over a wide range of input signals.

2. Prior Art

In a general sense, detection circuits may be classified into two broad groups. In the first group are circuits which protect a system from transient conditions or disturbances which occur external to the system. Some of the well known transient conditions are; over-voltage, under-voltage, over-current and under-current. The general approach in solving the problems in the first group is to sense the abnormal condition at an external point to the system to be protected and isolating the system once the abnormal condition is sensed. One of the well known procedures is to select an alternate path to ground once the abnormal condition is sensed.

In the second group are circuits which sense malfunction conditions occurring within the system to be protected. In other words, the malfunction is generated within the system rather than a malfunction occurring without the system as in the first group previously mentioned.

The present invention may be useful in systems classified in both the first group and second group, but finds its greatest utility in the systems which are classified within the second group.

In general, the present invention is directed to circuits for sensing the malfunction in an amplifier. More specifically, the invention is directed to circuits for sensing the malfunction in an amplifier which drives the take-up spool and supply spool of a reel-to-reel tape transport. An alternate use is for sensing malfunction occurring in amplifiers which drive the motors in an X-Y coordinate library system.

Reel-to-reel tape transport systems are widely known. In one form a generally cylindrical mandrel or drum includes a rotating head wheel which carries one or more read/write heads. The magnetic tape engages the mandrel at one point, makes a helical wrap-around at least a portion of the mandrel, and exits the mandrel at a point which is both axially and circumferentially spaced from the entrance point. The angle of helical tape wrap can vary in accordance with design choice, but is usually between 180° and 360°. The head wheel rotates so as to sweep its magnetic heads traversely across the tape. The angle at which the head enters and exits the tape may vary in accordance with design choice, from slightly less than 90° to a small angle, such as 15°.

A supply spool and a take-up spool is positioned so as to bring the tape in transducing relationship with the rotating head. Each spool is driven by a motor. The motor is in turn driven by power amplifiers. Due to the accuracy which is required in controlling the tension in the tape, any malfunction in the power amplifiers must be instantaneously detected. Failure to detect malfunction will result in snapping or breaking of the tape.

Various techniques have been used in the prior art for detecting amplifier malfunction or for detecting error within a servo control system. In one scheme a predetermined constant error is generally introduced by conventional means. For example, if a constant load is being driven by the servo system, a torque motor is used to apply a torque opposite to the direction in which the load is moved. The torque is used to displace a potentiometer arm and an electrical error signal is introduced into the system. The error signal is fed back into the system and is monitored. Any deviation from the known error signal is a warning that the system is malfunctioning.

Although the prior art devices embodying the above enumerated scheme operates satisfactorily for the intended purpose, there are several problems which plague these devices. One of the problems is the high cost and bulkiness of these prior art devices. The high cost stems from the fact that in order to introduce the constant error into the system, additional hardware is required; for example, the torque motor and the circuit for converting the torque into an electrical signal. The additional cost of this hardware increases the overall unit cost. Also the additional hardware adds to the overall size and hence, the bulkiness of the unit.

As is well known to those skilled in the art, the present demand is for low cost miniaturized components. With this restraint, the prior art devices are not suitable for several applications.

Another drawback with the prior art servo monitoring scheme is that the load which is driven by the servo system has to be constant. In a servo system where the load is varying, the prior art scheme will not function satisfactorily to detect malfunction in the system. There are several applications wherein the malfunction detector must detect malfunction in a servo system which is driving a variable load. For example, a reel-to-reel servo control system wherein the load (magnetic media) on the take-up spool varies.

Another prior art scheme which has been used to detect amplifier malfunction in a servo controlled system is the so-called random sampling approach. This scheme requires a test run to be undertaken at a predetermined time during normal operation of the system.

Although the random sampling scheme has solved some of the problems which were created by the scheme in which error is introduced into the system, several new problems are created.

In order to perform a test run on the system, the normal operation of the system has to be interrupted. This interference tends to reduce the throughput; i.e., the amount of work which is outputted from the system. With a random sampling scheme, the system is interrupted at intervals and a test run is performed. A known signal is introduced into the system or amplifier; for example, one volt and the output is monitored. If the output is within a prescribed range, the system is allowed to run. If the output is out of the prescribed range, the system is malfunctioning and corrective steps are taken.

Another problem is that if the system has intermittent failures, the random sampling technique may not detect these failures. In several applications it is important that failures or malfunctions be detected instantaneously. For example, in a reel-to-reel servo control system, any failure occurring in the amplifier means which is driving the takeup spool must be detected at once or else the media can be snapped.

Still another problem is the fact that the random sampling technique cannot continuously monitor the system for malfunction detection. In several applications, it is imperative that the malfunction device be capable of continuously monitoring or else intermittent undetected failure will be disasterous.

Finally, the prior art malfunction devices and schemes are operable over relatively narrow input signal range. However, there are several applications wherein monitoring has to be performed over relatively wide signal range (e.g., −20 volts, +20 volts) due to the signal range limitation, the prior art devices are not suitable.

OBJECTS OF THE INVENTION

It is, therefore, the object of this invention to detect amplifier malfunction in a more efficient and improved manner than was heretofor possible.

It is another object of the invention to produce a low cost miniaturized malfunction detector.

It is still another object of the invention to produce a malfunction detector which monitors malfunctions of an amplifier driving a variable load.

It is a further object of the invention to continuously monitor to detect malfunctions in an amplifier.

Still a further object of the invention is to detect amplifier malfunction over a wider signal range than was heretofore possible.

SUMMARY OF THE INVENTION

The present invention overcomes the drawbacks found in the prior art by means of an improved circuitry which continuously monitors the operation of a wide band amplifier means to detect malfunction. The output of the amplifier means is fed back via an impedance circuitry to a summing junction positioned at the input to the amplifier means. Whenever the summing junction signal falls out of range of acceptable signal, the power supply is shut down.

In one embodiment of the invention, a filter means having a time constant equivalent to the dominant pole of the amplifier is positioned between the malfunction junction and the error detection means. This embodiment improves the reliability of the error detection scheme in that the error detection means is desensitized until the amplifier is operating at steady state. With this design false alarm due to amplifier slew rate or high frequency triggering is eliminated.

In another embodiment of the invention a gain switch means is positioned between the malfunction junction and the filter means. The switch means is in a non-inverting gain configuration. This gain switch means widens the reference band so that the amplifier may operate with an overdrive signal in a saturation state without generating a malfunction signal.

The foregoing and other objects, features and advantages of the invention will be apparent from the following more particular description of preferred embodiments of the invention, as illustrated in the accompanying drawings.

DESCRIPTION OF THE PREFERRED EMBODIMENT

Figure 1:
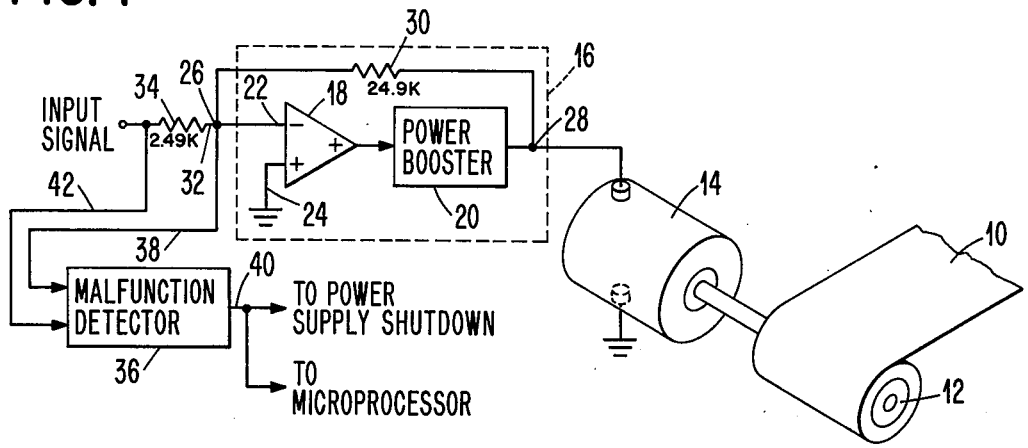
FIG. 1 is a perspective view of a reel-to-reel tape control system with the malfunction detector of the present invention in block diagram form.

FIG. 1 illustrates the simplest form of the malfunction detector as it is incorporated in a reel-to-reel tape transport system. In the drawings similar elements are identified by the same numbers. In its simplest form, the tape transport unit comprises magnetic media 10. One end of magnetic media 10 is wound onto take-up spool 12. Driving means 14 rotates spool 12 in a clockwise or counterclockwise direction. Whenever spool 12 is rotated in the clockwise direction, the amount of magnetic media 10 on the spool increases. Likewise, if spool 12 is rotated in the counterclockwise direction, the amount of magnetic media 10 on the spool decreases. With this configuration, the combination of spool 12 and magnetic media 10 represents a variable load means for driving means 14. The other end of magnetic media 10 is wound onto a supply spool (not shown). A more detailed description of a reel-to-reel system in which the malfunction detector can be utilized is found in U.S. Pat. No. 3,809,335 entitled "Web Movement Controlled in a Reel-to-Reel Web Transport" issued to J. P. Mantey and assigned to the assignee of the present invention. Also, publication entitled "Tachometer Feedback in a Reel-to-Reel Control System" by N. H. Hansen, Jr., published in IBM Technical Disclosure Bulletin, Volume 17, No. 11, April, 1975, page 3194, discloses a similar reel-to-reel system.

Although the invention is described in relation-ship with a reel-to-reel tape transport system, this should be construed as illustrative and not a limitation on the scope of the invention; since the malfunction detector finds use in any application where a power amplifier has to be monitored for malfunctioning.

Still referring to FIG. 1, the malfunction detection is comprised of power amplifier 16. The output of power amplifier 16 is connected to driving means 14 and output signals which control driving means 14. Power amplifier 16 is comprised of operational amplifier 18 connected in series with power booster 20. Operational amplifier 18 is comprised of a negative input terminal 22 and a positive input terminal 24. Positive input terminal 24 is tied to ground.

Malfunction junction 26 hereinafter called malfunction detection means 26 is connected to negative input terminal 22. Basically, malfunction detection means 26 is a summing junction. It accepts a feedback signal from terminal 28 which ties the output of power amplifier 16 to malfunction detection means 26 via feedback resistive means 30. Also, malfunction detection means 26 accepts a signal from terminal 32. The signal on terminal 32 is derived from an external driving source, for example, $E_{in}$ (see FIG. 2). The external driving source is connected by input resistive means 34 to terminal 32. Malfunction detection means 26 sums the two signals, one on terminal 28 and the other on terminal 32 and outputs an error signal. The error signal is used for driving power amplifier 16. The error signal is also fed into malfunction detector 36 via terminal 38. As will be explained subsequently, the error signal on terminal 38 is compared with a reference range of signal in malfunction detector 36 and a malfunction signal is outputted on terminal 40 whenever the error signal is not within a predetermined range. The malfunction signal is used to either shut down the power supply or inform a microprocessor that power amplifier 16 is defective.

As will be explained subsequently, the input signal is picked off by terminal 42 and fed into malfunction detector 36. Malfunction detector 36 has circuitry which monitor and control the signal on terminal 42 so that power amplifier 16 can be driven into saturation without outputting a malfunction signal on terminal 40.

Figure 2:
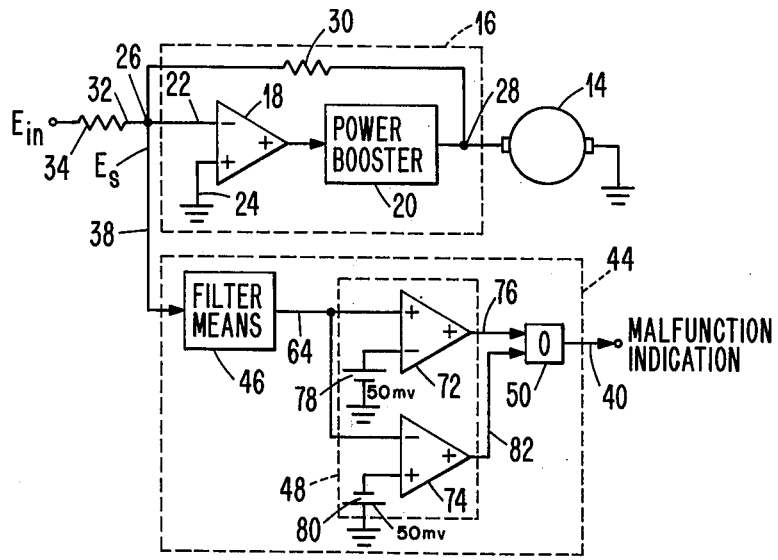
FIG. 2 shows a more detailed view of a motor power amplifier and the malfunction detector with filtering means.

Referring now to FIG. 2, section 44 of the malfunction circuitry of malfunction detector 36 is shown in greater detail. Malfunction circuitry 44 is comprised of filter means 46, compare means 48 and OR circuit means 50. Filter means 46, compare means 48 and OR circuit means 50 are connected in tandem. The output from OR circuit means 50 appears on terminal 40 and indicates when there is a malfunction.

The theory underlining the detection of circuit malfunction is that in normal operation of power amplifier; the error voltage $E_s$ (see FIG. 2) which appears on terminal 38 from malfunction detection means 26 will be very close to zero (offset term plus output/open loop gain). A malfunction will cause $E_s$ to rise above or fall below a few millivolts of ground. By monitoring the fall or rise and comparing it with a standard range of reference voltages, one can determine when malfunction occurs in power amplifier 16.

However, it is well known that at initial startup; i.e., whenever the amplifier is running at high frequencies or if the slew rate of the amplifier is exceeded, compare means 48 will output a signal which will activate OR circuit means 50 and output a malfunction signal on terminal 40 when in fact there is no malfunctioning in amplifier 16. To alleviate this false alarm, filter means 46 is incorporated as shown in FIG. 2.

Figure 2A:
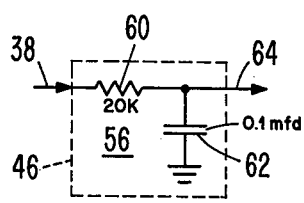
FIG. 2A shows an alternate embodiment of a filter means.
Figure 2B:
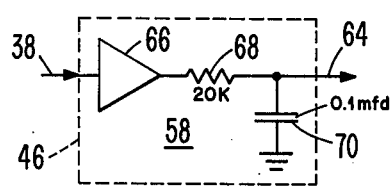
FIG. 2B shows one type of voltage follower filter means.

Referring now to FIG. 2A and FIG. 2B alternate embodiments of filter means 46 are shown.

In FIG. 2A, filter means 46 is comprised of a conventional RC filter 56. Filter 56 is comprised of resistor 60 in series with capacitor 62. The time constant of filter means 46 is substantially equivalent to the dominant pole of the amplifier. Whenever filter means 46 is positioned in the circuitry of FIG. 2, the signal on terminal 64 will not be outputted until power amplifier 16 is running at steady state. With this configuration, any transient signal which is caused by startup or otherwise will not be able to reach compare means 48 and therefore the reliability of the system is enhanced.

Filter 58 (FIG. 2B) is an alternative to filter 56. Basically filter 58 is comprised of voltage follower 66, resistor 68 and capacitor 70. Voltage follower 66 is connected in series with resistor 68, and the combination is in series with capacitor 70.

Although filter 56 and filter 58 are needed for accurate malfunction detection, there are several applications wherein a filter is not required. For example, if the input signal ($E_{in}$ on terminal 32) is restricted (i.e.; no high frequencies and/or low slew rate) then a through wire, instead of filter 56 and filter 58, can be used to connect terminal 38 to terminal 64. In one embodiment a straight through wire is used to connect terminal 38 to terminal 64 and there was no degradation in the malfunction detection circuitry.

The signal from filter means 46 appears on terminal 64. Terminal 64 is attached to comparator means 48. Comparator means 48 is comprised of comparator 72 and comparator 74. Comparator 72 is the positive comparator and will output an error signal on terminal 76 whenever the error voltage $E_s$ from malfunction detection means 26 exceeds the allowable few millivolts range in the positive direction. Comparator 72 has a positive terminal which is tied to terminal 64 and a negative terminal which is tied to ground via positive reference battery 78. The voltage on battery 78 is equivalent to the maximum possible voltage which is allowable for proper operation of the amplifier 16. In other words, whenever error voltage $E_s$ exceeds the voltage on battery 78 a malfunction signal will appear on terminal 40. For example, in one embodiment battery 78 was set with 50 millivolts.

Likewise, comparator 74 is a conventional negative comparator with its negative terminal tied to terminal 64 and its positive terminal tied to ground via negative reference battery 80. Negative reference battery 80 stores a negative voltage, the value of which is equivalent to the maximum negative swing which can be experienced by malfunction detection means 26. Whenever the swing in the negative direction at malfunction detection means 26 exceeds the value on negative reference battery 80, an error signal is outputted on terminal 82. The signals on terminal 76 and terminal 82 are fed into OR circuit means 50 which in turn outputs a signal on terminal 40 indicative of a malfunction.

Figure 3:
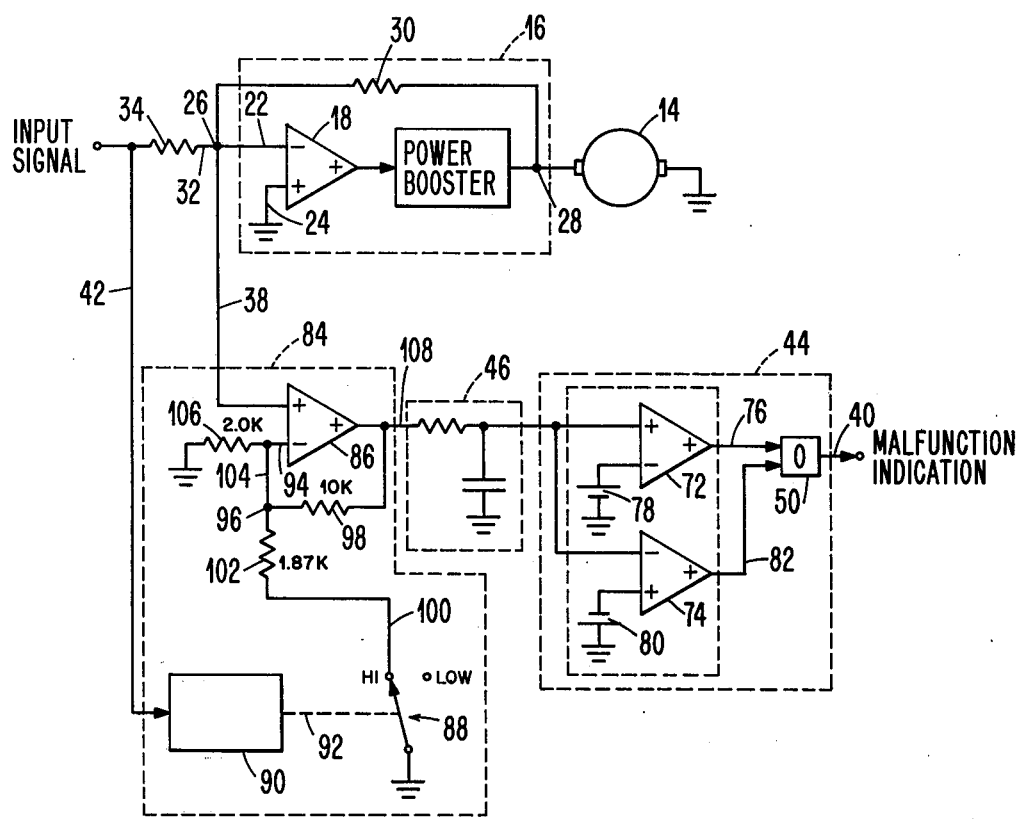
FIG. 3 shows the malfunction detector with gain switch means.

Referring now to FIG. 3, malfunction detection circuitry 84 of malfunction detector 36 is shown. As was mentioned previously, in some operation (for example, when amplifier 16 is used to control the drive motor of a library system), it is advantageous to operate the amplifier in a saturation state during peak acceleration periods. This can be done at the expense of reduced sensitivity to malfunction detection. To overcome this lack of sensitivity, malfunction detection circuitry 84 hereinafter called gain switch stage 84, may be incorporated as shown in FIG. 3. Essentially, gain switch stage 84 monitors the error signal on terminal 38 and the input signal on terminal 42. As long as the input signal on terminal 42 is below a predetermined level, amplifier 16 should not be in saturation, and buffer amplifier 86 will provide a relatively high gain for the malfunction signal on terminal 38. Therefore, for relatively low and moderate signal levels, a high degree of sensitivity may be maintained. At higher input signal levels; i.e., signal levels which drive amplifier 16 into saturation, the gain switch stage will reduce the gain of buffer amplifier 86. This has the effect of widening the sample window or reference band to handle the overdrive signal. However, the reduced malfunction detection sensitivity will only be felt at high signal levels. By positioning the gain switch stage prior to filter means 46, switch transient will not cause false signals.

Essentially, gain switch stage 84 is comprised of buffer amplifier 86, a single pole double throw gain switch means 88 and a magnitude threshold circuit means 90. Gain switch means 88 can also be a single pole single throw switch. Magnitude threshold circuit means 90 is a compare circuitry which is substantially analogous to compare means 48. It stores the minimum or threshold value of the input signal which will drive amplifier 16 into saturation. The stored value is then compared with the actual input signal which appears on terminal 42, and whenever the value of the signal on terminal 42 is equal to or less than the threshold value a signal is outputted on terminal 92 which switches gain switch means 88 to the high terminal and thereby forming a conductive path between ground and buffer amplifier 86. Likewise, if the value of the input signal on terminal 42 is above the value stored in threshold circuit means 90, gain switch means 88 will be in contact with the low terminal and therefore there will be no conductive path between ground and buffer amplifier 86.

Buffer amplifier 86 is comprised of a positive terminal which is connected to terminal 38 and a negative input which is connected to terminal 94. The output of buffer amplifier 86 is fed back to terminal 94. The output of buffer amplifier 86 is fed back to terminal 96 via a feedback resistor 98. Terminal 96 is connected to gain switch means 88 via conductor 100 through resistor 102 hereinafter called second resistive means 102. Likewise, terminal 96 is tied to terminal 94 via lead 104, while terminal 94 is tied to ground through resistor 106, hereinafter called first resistive means 106. The output from buffer amplifier 86 appears on terminal 108. This completes the detailed description of the preferred embodiment.

Operation

As was previously mentioned, the malfunction detector is based on the theory that during normal operation of power amplifier 16, the voltage $E_s$ at malfunction detector means 26 should be ideally zero. However, due to the offset term and output/open loop gain, $E_s$ would swing about the zero point. The swing is generally in the area of plus or minus a few millivolts. By monitoring the swing in voltage $E_s$ and comparing the swing with standard reference voltage, one is able to pinpoint malfunction in amplifier 16 over its entire operational range.

In operation, an input signal $E_{in}$ is applied to terminal 32. This signal can be derived from any conventional driving means, for example, a voltage source. The input signal is then registered at malfunction detection means 26. Simultaneously, any signal appearing at the output of amplifier 16 is fed back through feedback terminal 28 to malfunction detection means 26. Malfunction detection means 26 outputs an error signal which is the weighted difference in the sum of the input signal on terminal 32 and the signal which appears on terminal 28. If the error signal $E_s$ is within a few millivolts (i.e., positive or negative) of ground, the amplifier is operating normally and will not be disturbed.

The permissible voltage swing of $E_s$ is stored on positive reference battery 78 and negative reference battery 80. The voltage $E_s$ from malfunction detection means 26 is constantly compared with the reference voltages stored on positive reference battery 78 and negative reference battery 80. Whenever $E_s$ exceeds either of these voltages, an error signal will appear on terminal 40. The signal is used to close down the power supply and/or to signal the microprocessor.

In order to prevent false alarm due to slew rate or high frequency triggering of the amplifier, filtering means 46 is incorporated so that the compare means will not be activated until the system is running at steady state. The time constant of the filter is substantially equivalent to the dominant pole of the amplifier.

As was previously stated, in some operation it is advantageous for one to operate the amplifier when it is saturated. In order to achieve this goal, gain switch stage 84 is incorporated. In operation, the error signal which appears on terminal 38 is fed into buffer amplifier 86. Simultaneously, the input signal $E_{in}$ is fed into magnitude threshold circuit means 90. Magnitude threshold circuit means 90 will compare the input signal on terminal 42 with a standard predetermined signal. As long as the input signal is not greater than or equal to the predetermined threshold value, gain switch means 88 will attach to the high terminal which results in a closed circuit. With the closed circuit configuration, the gain of buffer amplifier 86 is one plus the feedback resistor 98 divided by the parallel combination of resistive means 106 and resistive means 102:

$$\frac{1 + R_{98}}{\frac{R_{106} R_{102}}{R_{106} + R_{102}}}$$

Where
$R_{98}$ = feedback resistor 98, and
$R_{106}$ = resistive means 106, and
$R_{102}$ = resistive means 102

Buffer amplifier 86 enables the malfunction detector to maintain its sensitivity as long as amplifier 16 is not driven into saturation.

If the input signal ($E_{in}$) exceeds or is equal to the stored predetermined signal of magnitude threshold circuit 90, the gain of buffer amplifier 86 is reduced. Although the malfunction detector is less sensitive, it will detect any malfunction which will occur while the amplifier is being driven at a saturated rate. In order to reduce the gain of buffer amplifier 86, the signal which appears on terminal 92 will switch gain switch means 88 to its low terminal thereby rendering a nonconductive path between ground and buffer amplifier 86. In other words, there is an open circuit. In the open configuration, the gain of buffer amplifier 86 is reduced. Theoretically, the gain is equivalent to: $1 + R_{98}/R_{106}$. By effectively increasing the resistance in the circuit, the gain of buffer amplifier 86 is reduced.

The advantage of the above described invention enables one to monitor a wide band amplifier for malfunction over its entire signal range.

By varying the gain of gain switch stage 84 as a function of the input voltage, one can allow the amplifier to be operated in a saturation mode.

While the invention has been particularly shown and described with reference to a preferred embodiment thereof, it will be understood by those skilled in the art that various changes in form and detail may be made therein without departing from the spirit and scope of the invention.

What is claimed is:

1. Apparatus for detecting malfunction in a power amplifier comprising:
    amplifier means;
    control means for producing a controlled signal to drive said amplifier;
    malfunction means operably connected to said control means for summing a plurality of signals;
    feedback means operably connected for feeding back a signal from the output of the amplifier to the malfunction means;
    compare means to compare the signal from the malfunction means with reference signals; and
    means for outputting an error signal indicative of the amplifier malfunction when the range of reference signals is exceeded.

2. The device as claimed in claim 1 further including filter means for desensitizing the compare means so as to prevent the output means from outputting an error signal due to transient and/or relatively high frequencies in the input signal.

3. The device as claimed in claim 2 wherein the filter means has a time constant approximately equivalent to the dominant pole of the amplifier.

4. The device as claimed in claim 1 wherein the malfunction means is a summing junction which accepts a drive signal and a feedback signal and outputs an error signal having a magnitude representative of the amplifier malfunction.

5. The device as claimed in claim 1 wherein the feedback means comprises an impedance feedback network.

6. The device as claimed in claim 1 wherein the compare means comprises:
- a first comparator for comparing two signals, said comparator including an operational amplifier for establishing the upper limit of a predetermined range;
- a first storage means operably connected to said operational amplifier and to determine the upper limit of the range to be compared;
- a second comparator positioned in parallel with the first comparator said second comparator including an operational amplifier to establish a lower limit of a predetermined range; and
- a second storage means operably connected to said operational amplifier to determine the lower limit of the range to be compared.

7. A malfunction device to detect malfunction in a wide band amplifier comprising:
- a load means;
- an amplifier means driving said load means;
- input means for producing a driving signal for said amplifier;
- feedback means tying the output of said amplifier to its input; and
- malfunction detector means for sensing malfunction in the system and outputting an error signal which powers down and/or signals the system.

8. An improved malfunction detector for a reel-to-reel magnetic tape transport having a supply spool and a take-up spool, the improvement comprising:
- a first drive means operably connected for driving the take-up spool;
- amplifier means operably connected for controlling said drive means;
- a second drive means operably connected to drive said amplifier;
- malfunction junction operably connected to said amplifier means for detecting malfunction in the amplifier;
- feedback means operably connected to tie the output of said amplifier means to the malfunction junction;
- gain switch means operably connected for limiting the second drive means signal;
- filter means connected to the gain switch for desensitizing the malfunction signal;
- compare means to compare the malfunction signal with reference signals; and
- means for outputting an error signal indicative of the amplifier malfunction when the range of reference signal is exceeded.

9. The apparatus as claimed in claim 8 wherein the gain switch means comprises:
- circuit means to determine when a signal is out of a predetermined range;
- switch means positioned within the path of said signal to be operative when the signal is out of the predetermined range;
- amplification means positioned to receive a plurality of signals; and
- gain control means operably associated with said amplification means whereby the gain of said amplification means can be controlled by closing or opening the switch means.

10. The device as claimed in claim 9 wherein the gain control means comprises a plurality of resistors positioned so as to form a plurality of combination wherein one of said combination being a series combination and another of said combination is a series parallel combination.

11. An improved power amplifier with malfunction detection means gain switch stage for regulating the input signal so that the amplifier may be operated in saturation without losing sensitivity, the improvement comprising:
- amplifier means;
- first means for inputting a first drive signal;
- second means for generating an error signal indicative of amplifier malfunction;
- circuit means to receive said first drive signal and to determine when said first drive signal exceeds a predetermined value;
- buffer means operably positioned to receive the error signal;
- feedback resistive means tying the output of said buffer means to its input;
- first resistive means operably associated with said feedback resistive means to form a series combination;
- second resistive means operably associated with said feedback resistive means to form a series parallel combination;
- gain switch means operably connected with the circuit means for controlling the gain of the buffer means.

* * * * *